(12) United States Patent
Nozaki et al.

(10) Patent No.: US 8,009,976 B2
(45) Date of Patent: Aug. 30, 2011

(54) CAMERA HAVING FACE DETECTION AND WITH AUTOMATIC FOCUS CONTROL USING A DEFOCUS AMOUNT

(75) Inventors: Hirotake Nozaki, Port Washington, NY (US); Akira Ohmura, Tokyo (JP)

(73) Assignee: Nikon Corporation, Tokyo (JP)

( * ) Notice: Subject to any disclaimer, the term of this patent is extended or adjusted under 35 U.S.C. 154(b) by 247 days.

(21) Appl. No.: 11/727,866

(22) Filed: Mar. 28, 2007

(65) Prior Publication Data

US 2007/0248345 A1 Oct. 25, 2007

(30) Foreign Application Priority Data

Apr. 4, 2006 (JP) .................................. 2006-102781

(51) Int. Cl.
*G03B 3/00* (2006.01)
*G03B 13/00* (2006.01)
(52) U.S. Cl. ..................... 396/123; 396/128; 348/362
(58) Field of Classification Search .................... 396/123
See application file for complete search history.

(56) References Cited

U.S. PATENT DOCUMENTS

| 5,986,764 | A | 11/1999 | Nonaka |
| 6,470,148 | B2 * | 10/2002 | Ide et al. ........................ 396/80 |
| 7,706,675 | B2 * | 4/2010 | Nozaki et al. .................. 396/123 |
| 2002/0150308 | A1 * | 10/2002 | Nakamura ...................... 382/286 |
| 2004/0207743 | A1 * | 10/2004 | Nozaki et al. ............. 348/333.12 |
| 2007/0110422 | A1 | 5/2007 | Minato et al. |
| 2009/0284645 | A1 * | 11/2009 | Nozaki et al. .................. 348/349 |

FOREIGN PATENT DOCUMENTS

| EP | 1 653 279 A1 | 5/2006 |
| JP | A 8-063597 | 3/1996 |
| JP | A 2001-016573 | 1/2001 |
| JP | 2001-215403 A | 8/2001 |
| JP | A 2003-107335 | 4/2003 |
| JP | A 2005-086682 | 3/2005 |
| WO | WO 2005/006072 A1 | 1/2005 |

OTHER PUBLICATIONS

Japanese Office Action with English-language translation for Japanese Application No. 2006-102781, mailed Dec. 21, 2010.

* cited by examiner

*Primary Examiner* — Clayton E Laballe
*Assistant Examiner* — Bret Adams
(74) *Attorney, Agent, or Firm* — Oliff & Berridge, PLC

(57) ABSTRACT

A camera has a face detecting section, a focusing section, and a controlling section. The face detecting section detects a face area in a shooting image plane. The focusing section calculates a defocus amount based on a relative distance of a pair of images of a light beam that has passed through a shooting lens in each of a plurality of optional areas in the shooting image plane. The controlling section designates a focusing area among the optional areas based on an output of the face detecting section and performs a focusing operation of the shooting lens based on the defocus amount in the focusing area.

6 Claims, 6 Drawing Sheets

CAMERA HAVING FACE DETECTION AND WITH AUTOMATIC FOCUS CONTROL USING A DEFOCUS AMOUNT

CROSS REFERENCE TO RELATED APPLICATION

This application is based upon and claims the benefit of priority from Japanese Patent Application No. 2006-102781, filed on Apr. 4, 2006, the entire contents of which are incorporated herein by reference.

BACKGROUND OF THE INVENTION

1. Field of the Invention

The present invention relates to a camera that performs focus control based on a result of a face detection.

2. Description of the Related Art

As disclosed, for example, in Japanese Unexamined Patent Application Publication No. 2005-86682, a camera performs automatic focus control (AF) by detecting a face of a subject in a shooting image plane is known. Particularly, in recent years, a monocular reflex type camera that performs AF by a face detecting process has been studied.

However, for a monocular reflex type camera that performs AF by detecting a face, the following problem has been pointed out. Generally, when AF is performed by detecting a face, a practical structure is to perform AF in an image plane by an image pickup device that detects a face based on a contrast detecting method. However, when AF is performed based on the contrast detecting method, it takes a long time for the focusing operation, since a focus position is detected in comparison with the former focus evaluation value. Thus, the quick shooting performance of the camera deteriorates and causes to increase the risk of missing the right moment to capture an image. Japanese Unexamined Patent Application Publication No. 2005-86682 does not disclose any means of solving such a problem.

SUMMARY OF THE INVENTION

The present invention is to solve such a problem of the related art. An object of the present invention is to provide a mean of quickly performing AF based on a result of a face detection especially for a monocular reflex type camera.

A first aspect of the present invention is a camera that has a face detecting section, a focusing section, and a controlling section. The face detecting section detects a face area in a shooting image plane. The focusing section calculates a defocus amount based on a relative distance of a pair of images of a light beam that has passed through a shooting lens in each of a plurality of optional areas in the shooting image plane. The controlling section designates a focusing area among the optional areas based on an output of the face detecting section and performs a focusing operation of the shooting lens based on the defocus amount in the focusing area.

A second aspect of the present invention is the camera of the first aspect, wherein the face detecting section detects the face area in a range of which the defocus amount is calculatable in the shooting image plane.

A third aspect of the present invention is the camera of the first aspect, wherein the controlling section designates the optional area closest to a center of the face area as the focusing area when there are a plurality of the optional areas corresponding to a single face area.

A fourth aspect of the present invention is the camera of the first aspect, wherein the controlling section designates the optional area corresponding to positions of eyes of the face area as the focusing area when there are a plurality of the optional areas corresponding to a single face area.

A fifth aspect of the present invention is the camera of the fourth aspect, wherein the controlling section designates the optional area closest to a center of the shooting image plane as the focusing area when there are a plurality of the optional areas corresponding to positions of eyes in the face area.

A sixth aspect of the present invention is the camera of the fourth aspect, wherein the controlling section designates the optional area closest to the subject eye corresponding to the face area as the focusing area when there are a plurality of the optional areas corresponding to positions of the eyes in the face area.

A seventh aspect of the present invention is the camera of the first aspect, wherein the controlling section adjusts a depth of field based on the defocus amount obtained from each of the plurality of the optional areas in the face area.

BRIEF DESCRIPTION OF DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Figure 1:
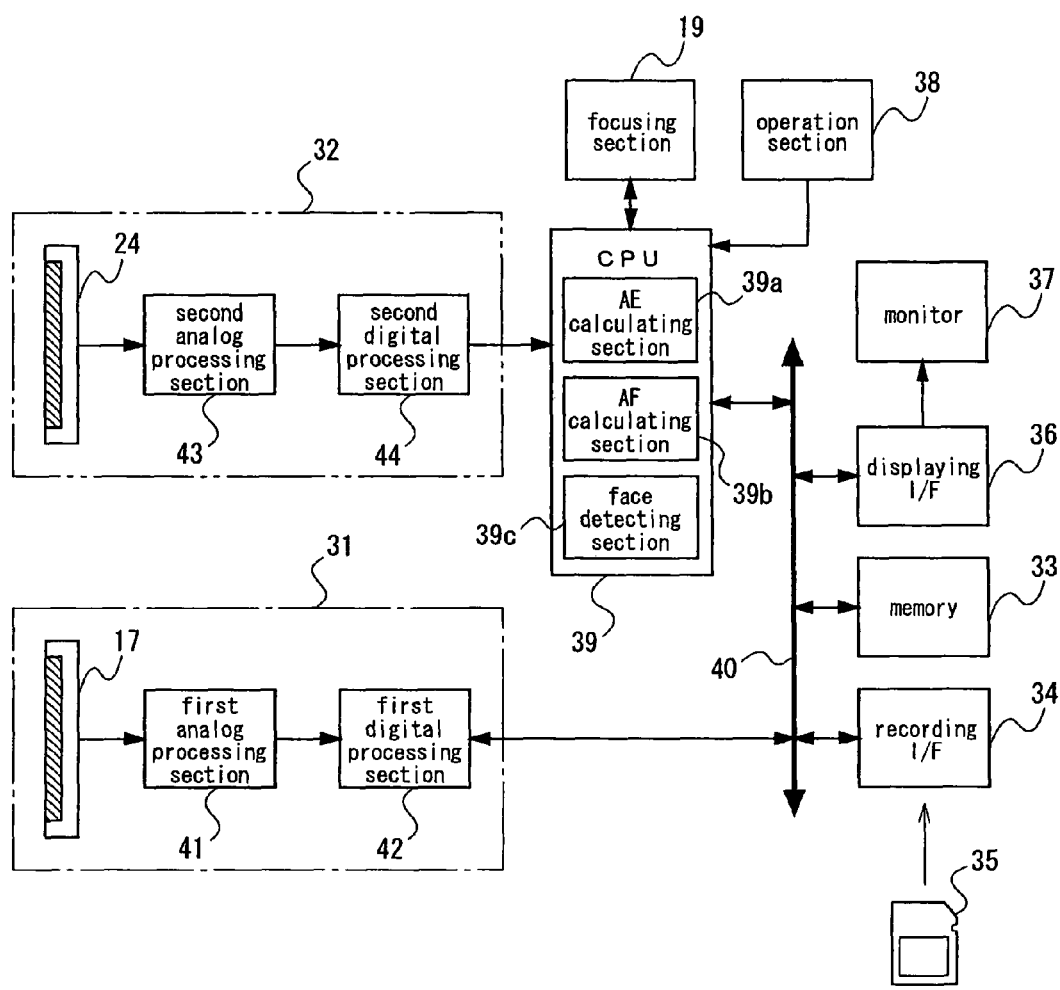
FIG. 1 is a block diagram showing a structure of an electronic camera according to an embodiment of the present invention.
Figure 2:
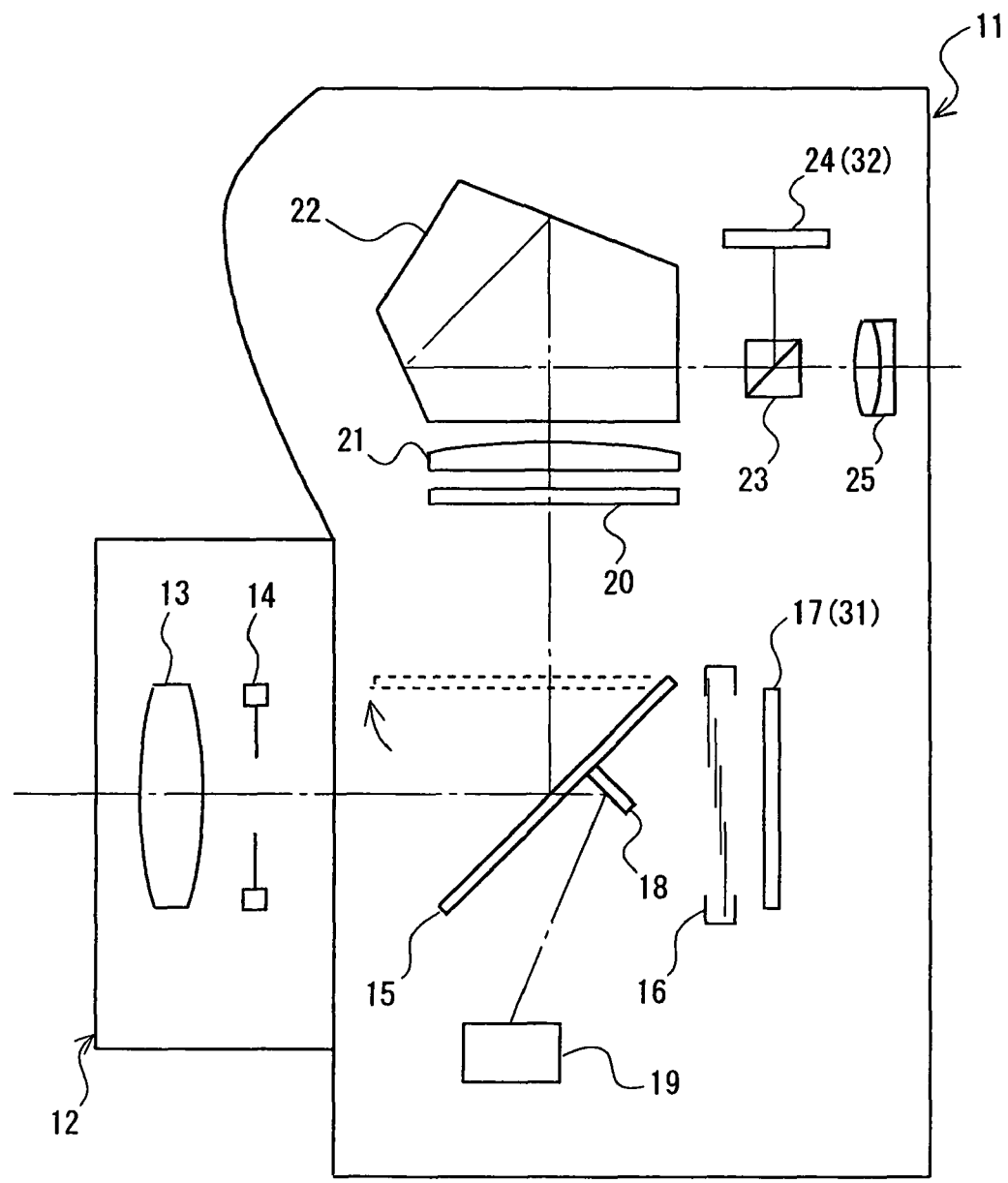
FIG. 2 is a schematic diagram showing a shooting mechanism of the electronic camera according to this embodiment of the present invention.

Next, with reference to the accompanying drawings, a structure of a monocular reflex type electronic camera according to an embodiment of the present invention will be described. FIG. 1 is a block diagram showing a structure of the electronic camera of this embodiment. FIG. 2 is a schematic diagram showing a shooting mechanism of the electronic camera of this embodiment.

First of all, with reference to FIG. 2, the shooting mechanism of the electronic camera will be described. The electronic camera of this embodiment has a camera body 11 and a lens unit 12 that contains a shooting optical system.

The camera body 11 and the lens unit 12 are provided with a pair of a male type mount and a female type mount (not shown). By connecting the mount of the lens unit 12 to the mount of the camera body 11 with a bayonet mechanism or the like, the lens unit 12 can be interchangeably connected to the camera body 11. These mounts also have electric contacts.

Thus, when the camera body 11 and the lens unit 12 are connected, their electrical connections are made through the electric contacts.

The lens unit 12 has a focusing lens 13 that is used to adjust the focus position and an aperture 14. The focusing lens 13 is structured such that it is movable in its optical axis direction by a motor (not shown). The aperture 14 adjusts the amount of incident light by opening and closing a diaphragm blade.

The camera body 11 has a main mirror 15, a mechanical shutter 16, a first image pickup device 17, a sub mirror 18, a focusing section 19, and a viewfinder optical system (20 to 25). The main mirror 15, the mechanical shutter 16, and the first image pickup device 17 are disposed along an optical axis of the shooting optical system. Disposed behind the main mirror 15 is the sub mirror 18. Disposed in an upper area of the camera body 11 is the viewfinder optical system. Disposed in a lower area of the camera body 11 is the focusing section 19.

The main mirror 15 is pivoted by a rotation shaft (not shown) such that the main mirror 15 is switchably placed between an observation state and a retraction state. When the main mirror 15 is placed in the observation state, the main mirror 15 is inclined in front of the mechanical shutter 16 and the first image pickup device 17. When the main mirror 15 is placed in the observation state, the main mirror 15 upwardly reflects a light beam that has passed through the shooting optical system and guides the light beam to the viewfinder optical system. A center portion of the main mirror 15 is a half mirror. A part of the light beam that main mirror 15 has transmitted is downwardly refracted by the sub mirror 18 and guided to the focusing section 19. On the other hand, when the main mirror 15 is placed in the retraction state, the main mirror 15 is leaped up along with the sub mirror 18 such that the main mirror 15 is away from the shooting optical path. When the main mirror 15 is placed in the retraction state, the light beam that has passed through the shooting optical system is guided to the mechanical shutter 16 and the first image pickup device 17.

The viewfinder optical system has a diffusing screen (focus plate) 20, a condensing lens 21, a pentagonal prism 22, a beam splitter 23, a second image pickup device 24, and an eyepiece lens 25. The diffusing screen 20 is disposed above the main mirror 15. The diffusing screen 20 temporarily images the light beam reflected by the main mirror 15 placed in the observation state. The light beam imaged on the diffusing screen 20 passes through the condensing lens 21 and the pentagonal prism 22. The light beam is guided from an exit plane of the pentagonal prism 22 having an angle of 90° to an incident plane thereof to the beam splitter 23. The beam splitter 23 splits the incident light beam into two paths. One light beam that has passed through the beam splitter 23 is guided to the second image pickup device 24 through a secondary imaging lens (not shown). The other light beam that has passed through the beam splitter 23 reaches one of the eyes of the user through the eyepiece lens 25.

Next, with reference to FIG. 1, a circuit structure of the electronic camera will be described. The camera body 11 has a focusing section 19, a recording-purpose imaging section 31, an analyzing-purpose imaging section 32, a memory 33, a recording I/F 34, a displaying I/F 36, a monitor 37, an operation section 38, a CPU 39, and a system bus 40. The recording-purpose imaging section 31, the memory 33, the recording I/F 34, the displaying I/F 36, and the CPU 39 are connected through the system bus 40. In FIG. 1, input and output between the CPU 39 and the lens unit 12 are not shown.

Figure 3:
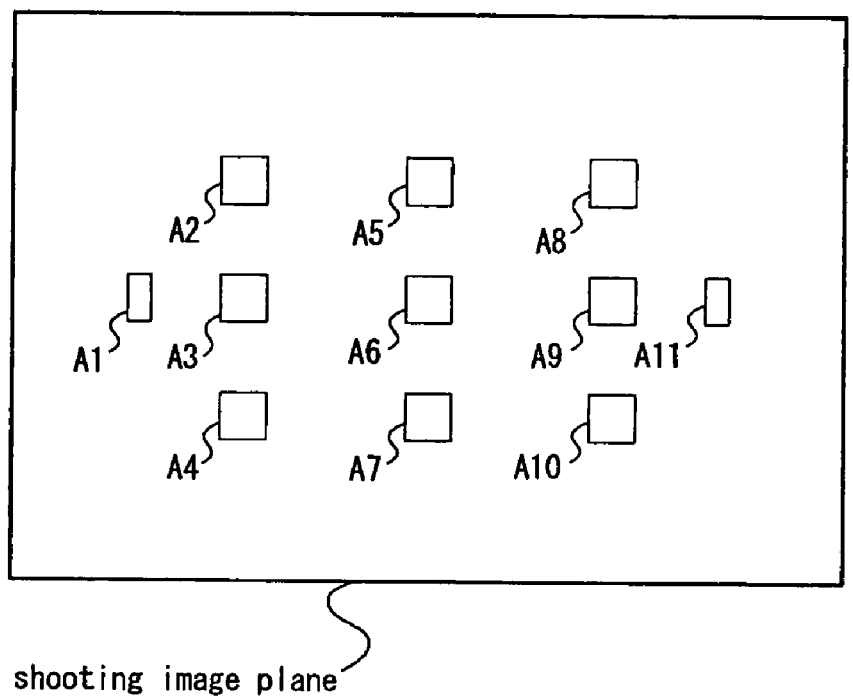
FIG. 3 is a schematic diagram showing an arrangement of optional areas in a shooting image plane.

The focusing section 19 detects focusing states in predetermined optional areas in the shooting image plane. The focusing section 19 of this embodiment has 11 optional areas in the shooting image plane. FIG. 3 shows an arrangement of the optional areas (A1 to A11) in the shooting image plane. Arranged at a center portion in the shooting image plane are the optional areas A2 to A10 in a lattice shape of 3×3. Arranged on left and right sides in the shooting image plane are the optional areas A1 and A11, respectively, the lattice-shaped optional areas A2 to A10 therebetween.

Figure 4:
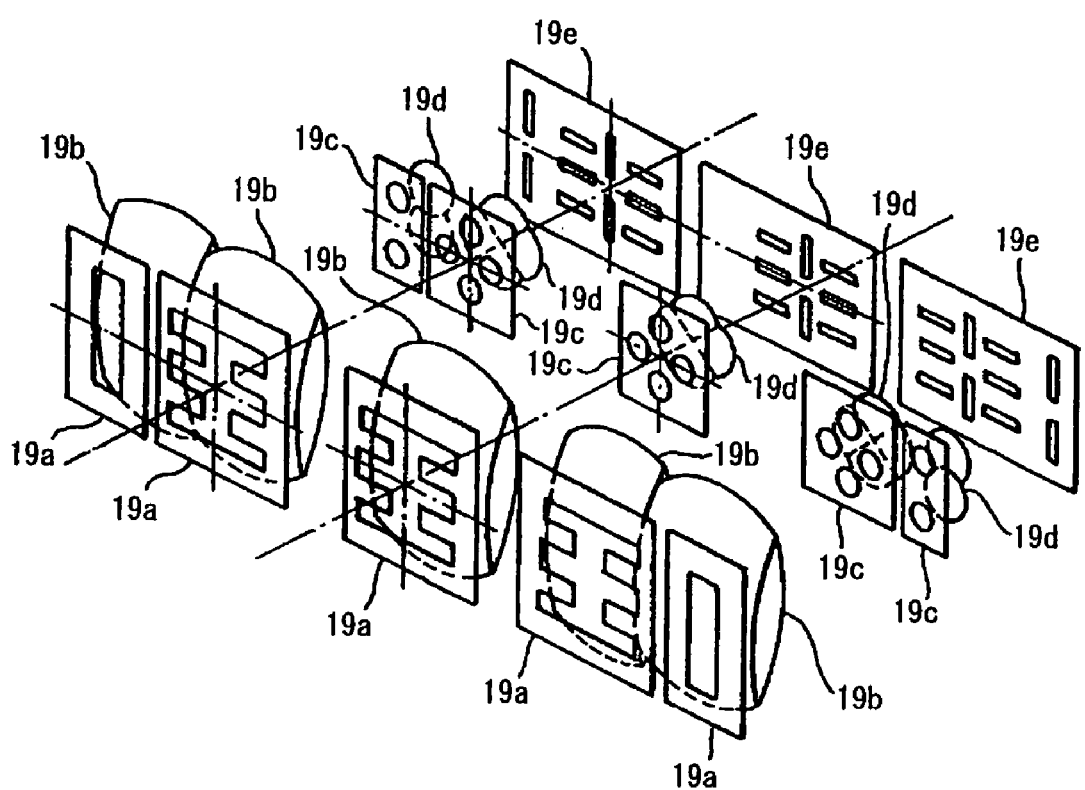
FIG. 4 is a perspective view showing an outline of an optical system of a focusing section according to this embodiment of the present invention.

FIG. 4 shows an outline of an optical system of the focusing section 19 of this embodiment. The focusing section 19 is provided with five sets of focusing optical systems. The right and left focusing optical systems shown in FIG. 4 correspond to the optional areas A1 and A11, respectively. The three center focusing optical systems correspond to the optical areas A2 to A10. Each of the focusing optical systems has a field mask 19a, a condensing lens 19b, an aperture mask 19c, a separator lens 19d, and a line sensor 19e. The field mask 19a of each of the three center focusing optical systems has an opening portion in the shape of a Chinese character which is two H's clung together side-by-side. The field mask 19a of each of the left and right end focusing optical systems has a rectangular opening that extends in the vertical direction.

The condensing lens 19b and the separator lens 19d of each of the focusing optical systems split a light beam emitted from a subject. In addition, each of the focusing optical systems detects an image phase difference amount of a subject image based on the distance between two images at the line sensor 19e corresponding to each optional area.

The recording-purpose imaging section 31 has the first image pickup device 17, a first analog processing section 41, and a first digital processing section 42.

The first image pickup device 17 is a sensor that generates a recording-purpose image. The first image pickup device 17 photoelectrically converts a subject image, which has passed through the shooting optical system and imaged after the release button has been pressed, into an analog signal of a shot image. An output signal of the first image pickup device 17 is input to the first analog processing section 41.

The first analog processing section 41 is an analog frontend circuit that includes a CDS circuit, a gain circuit, and an A/D converting circuit. The CDS circuit reduces a noise component of the output signal of the first image pickup device 17 by correlation double sampling. The gain circuit amplifies a gain of an input signal of the first analog processing section 41 and outputs an amplified signal. The gain circuit can adjust an image sensitivity equivalent to ISO sensitivity. The A/D converting circuit converts the output signal of the first image pickup device 17, which is an analog signal, into a digital signal. In FIG. 1, these circuits of the first analog processing section 41 are not shown.

The first digital processing section 42 executes various types of image processes (defect pixel compensation, color compensation, tone converting process, white balance adjustment, edge emphasis, and so forth) on the output signal of the first analog processing section 41 and generates data of the shot image. In addition, the first digital processing section 42 executes a compressing/decompressing process on data of the shot image. The first digital processing section 42 is connected to the system bus 40.

The analyzing-purpose imaging section 32 has the second image pickup device 24; a second analog processing section 43, and a second digital processing section 44. The structure of the analyzing-purpose imaging section 32 is almost the same as the structure of the recording-purpose imaging section 31. Thus, the description of the redundant portions of these structures will be partly omitted.

The second image pickup device 24 is a sensor that analyzes the state of a subject in the shooting image plane when the electronic camera is placed in a shooting standby state. The second image pickup device 24 photoelectrically converts a subject image that has passed through the viewfinder optical system at intervals of a predetermined time period and generates an analog signal of a moving image. Data of the moving image are used for an automatic exposure (AE) calculation, a face detecting process, and so forth that will be described later. An output signal of the second image pickup device 24 is input to the second analog processing section 43.

The second analog processing section 43 is an analog frontend circuit that includes a CDS circuit, a gain circuit, an A/D converting circuit. The second digital processing section 44 executes a color compensating process and so forth on the moving image. Data of the moving image that are output from the second digital processing section 44 are input to the CPU 39.

The memory 33 is a buffer memory that temporarily stores data of a shot image before and after the imaging process is performed by the first digital processing section 42.

The recording I/F 34 has a connector through which the electronic camera is connected to a record medium 35. The recording I/F 34 writes/reads data of a shot image to/from the record medium 35 connected through the connector. The record medium 35 is composed of a hard disk, a memory card containing a semiconductor memory, or the like. FIG. 1 shows a memory card as an example of the record medium 35.

The displaying I/F 36 controls a display of the monitor 37 under the control of the CPU 39. The monitor 37 displays various types of images under the control of the CPU 39 and the displaying I/F 36. In this embodiment, the monitor 37 is composed of a liquid crystal display monitor. The monitor 37 can display a reproduced image of a shot image, a menu screen on which data can be input in the GUI (Graphical User Interface) format, and so forth. In addition, the monitor 37 can display a state of a field based on a moving image of the analyzing-purpose imaging section 32 when the electronic camera is placed in the shooting standby state (these images are not shown).

The operation section 38 has a release button, operation buttons, and so forth. The release button of the operation section 38 is used to accept an exposure operation start command that the user inputs. The operation buttons of the operation section 38 are used to accept a command that the user inputs on the menu screen and so forth and a shooting mode switching command for the electronic camera that he or she inputs.

The CPU 39 controls an operation of each section of the electronic camera and executes various types of calculations necessary for shooting. When the electronic camera is placed in the shooting mode, the CPU 39 drives the main mirror 15, the mechanical shutter 16, and so forth. In addition, the CPU 39 controls operations of the focusing lens 13 and the aperture 14 of the lens unit 12 through the mounts.

In addition, the CPU 39 functions as an AE calculating section 39a, an AF calculating section 39b, and a face detecting section 39c according to a program stored in a ROM (not shown).

The AE calculating section 39a executes a known AE calculation based on an output of the analyzing-purpose imaging section 32 and decides shooting conditions (exposure time, f-number, and shooting sensitivity) when the electronic camera is placed in the shooting state.

The AF calculating section 39b selects a focusing area from the optional areas of the focusing section 19. The AF calculating section 39b calculates a defocus amount (amount of deviation from the focus position and direction of deviation) of the focusing lens based on an output of the focusing area of the focusing section 19. The AF calculating section 39b selects a focusing area based on a result of the face detecting process of the face detecting section 39c.

The face detecting section 39c detects a face area of a subject, the size of the face, and so forth with data of a moving image. The face detecting section 39c extracts a face area by an extracting process for feature points of a face as described, for example, in Japanese Unexamined Patent Application Publication No. 2001-16573. The feature points include for example end points of eyebrows, eyes, nose, and lips, in addition to contour points of face, vertex of head, and lower end point of chin. Instead, the face detecting section 39c may extract a contour of a skin color area based on color information of a subject, match the extracted contour with templates of prepared face parts, and detect a face from the subject as described, for example, in Japanese Unexamined Patent Application Publication No. Hei 8-63597.

Figure 5:
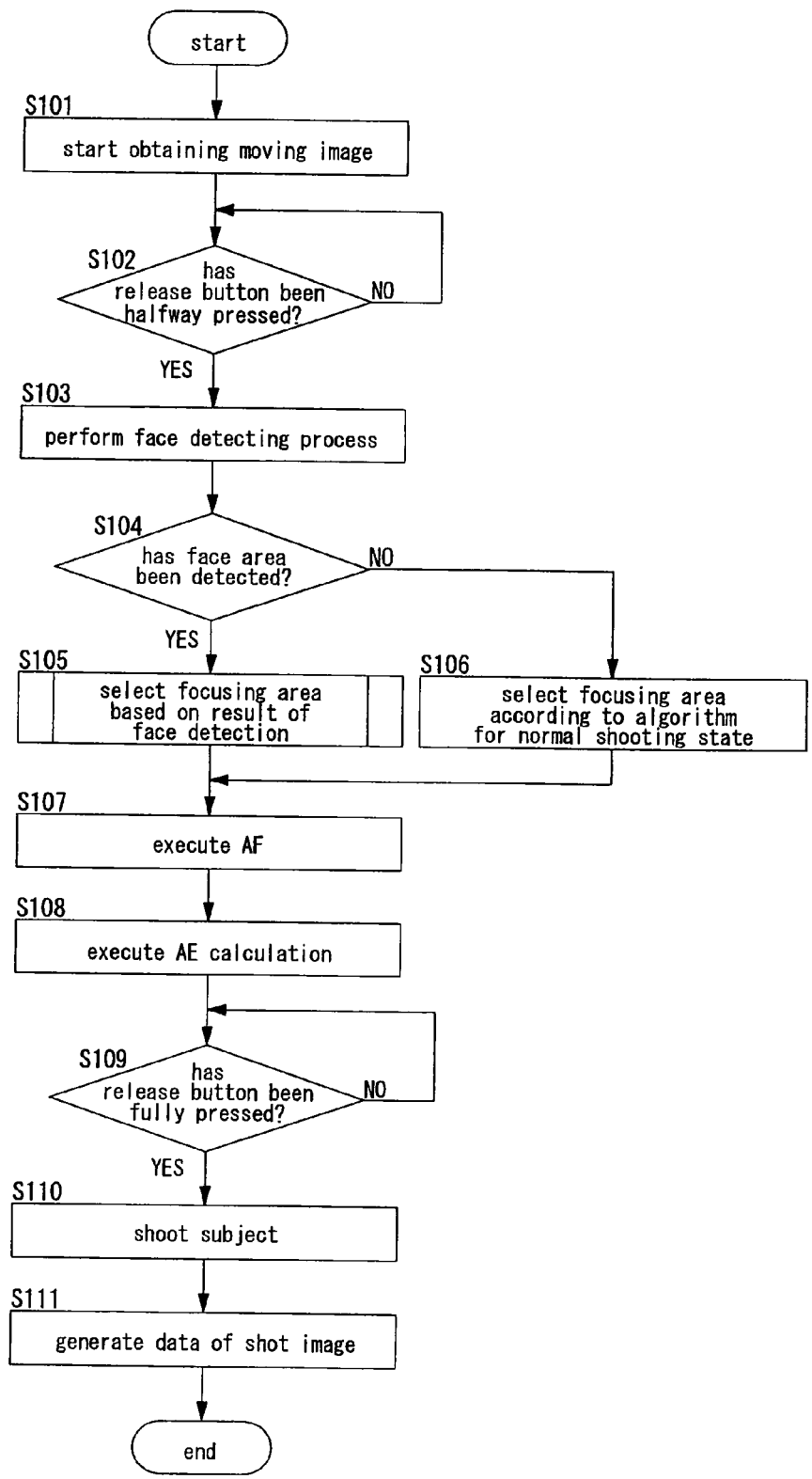
FIG. 5 is a flow chart showing an example of a shooting operation of the electronic camera according to this embodiment of the present invention.

Next, with reference to a flow chart shown in FIG. 5, an example of the shooting operation of the electronic camera of this embodiment will be described. In the following description, it is assumed that the face detecting function of the electronic camera has been turned on and the user frames a subject with the viewfinder optical system.

Step 101: When the operation section 38 accepts the shooting mode start operation by the user, the CPU 39 causes the analyzing-purpose imaging section 32 to obtain a moving image. The CPU 39 drives the second image pickup device 24 at intervals of a predetermined time period and successively obtains a moving image. At S101, the main mirror 15 is placed in the observation state.

Step 102: The CPU 39 determines whether or not the release button has been halfway pressed. When the release button has been halfway pressed (YES side), the flow advances to S103. In contrast, when the release button has not been pressed (NO side), the CPU 39 waits until the release button has been halfway pressed.

Step 103: The face detecting section 39c of the CPU 39 performs the face detecting process for the data of the moving image and detects a face area in the shooting image plane.

In this case, the face detecting section 39c detects a face area in a range of the arrangement of the optional areas of the focusing section 19 in the shooting image plane (namely, in a range of which a defocus amount can be calculated in any optional area in the shooting image plane). This is because a face area in a range of which the focusing section 19 cannot detect a focus is less likely to become a major subject. In addition, this face area does not influence a selection of a focusing area that will be described later.

Figure 6:
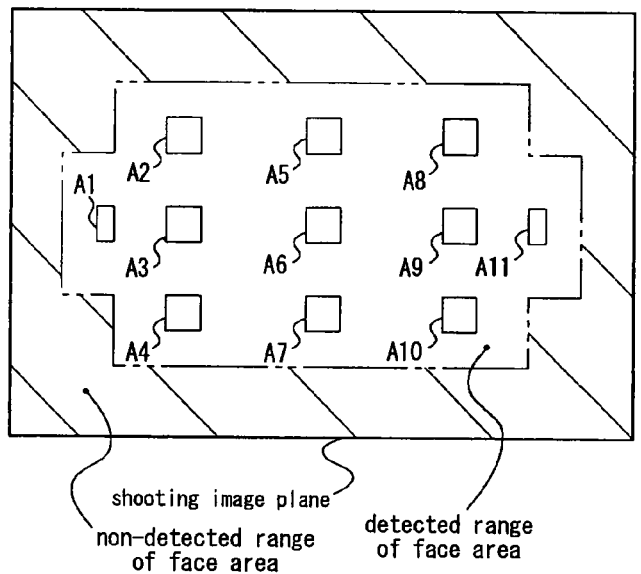
FIG. 6 is a schematic diagram showing the layout of the optional areas in the shooting image plane and a target area in a face detecting process.

FIG. 6 shows an example of a detection range of a face area in the shooting image plane. For example, the face detecting section 39c performs the face detecting process in all the shooting image plane and detects a face area that overlaps with a predetermined detection range. The face detecting section 39c may perform the face detecting process only for the detection range to reduce the calculation load.

Step 104: The CPU 39 determines whether or not a face area has been detected in a range of which a focus can be detected by the face detecting process at S103. When the foregoing condition is satisfied (YES side), the flow advances to S105. In contrast, when the foregoing condition is not satisfied (NO side), the flow advances to S106.

Step 105: The AF calculating section 39b of the CPU 39 selects a focusing area from the optional areas of the focusing section 19 based on the result of the face detection at S103. A focusing area selecting algorithm at S105 will be described later. Thereafter, the flow advances to S107.

Step 106: The AF calculating section 39b of the CPU 39 selects a focusing area from the optional areas of the focusing section 19 according to an algorithm for the normal shooting state. For example, the AF calculating section 39b selects a focusing area on a center priority basis or a shortest distance priority basis.

Step 107: The AF calculating section 39b calculates a defocus amount from the focusing area selected at S105 or S106 and executes AF.

Step 108: The AE calculating section 39a of the CPU 39 executes the AE calculation based on the moving image to adjust a shooting condition.

When a face area has been detected at S103, it is preferred that the AE calculating section 39a controls the f-number based on the defocus amount to adjust the depth of field.

Specifically, the AE calculating section 39a obtains a distance of the subject from each optional area corresponding to a face area. The AE calculating section 39a increases the f-number and the depth of field based on the distances from the subject. Thus, since all face areas can be focused, when a subject of one person is shot, a part of the face becoming blurred can be prevented. In addition, when a subject of a plurality of people is shot, all of them can be focused.

Step 109: The CPU 39 determines whether or not the release button has been fully pressed. When the release button has been fully pressed (YES side), the flow advances to S110. In contrast, when the release button has not been pressed (NO side), the CPU 39 waits until the release button has been fully pressed.

Step 110: The CPU 39 causes the main mirror 15 to retract from the shooting optical path and the first image pickup device 17 to drive to shoot the subject image.

Step 111: The CPU 39 causes the recording-purpose imaging section 31 to generate data of the shot image. Finally, data of the shot image are recorded to the record medium 35. As a result, a sequence of steps of the shooting operation is completed. When the shooting is continued, the flow returns to S102. At S102, the CPU 39 repeats the foregoing operation.

Figure 7:
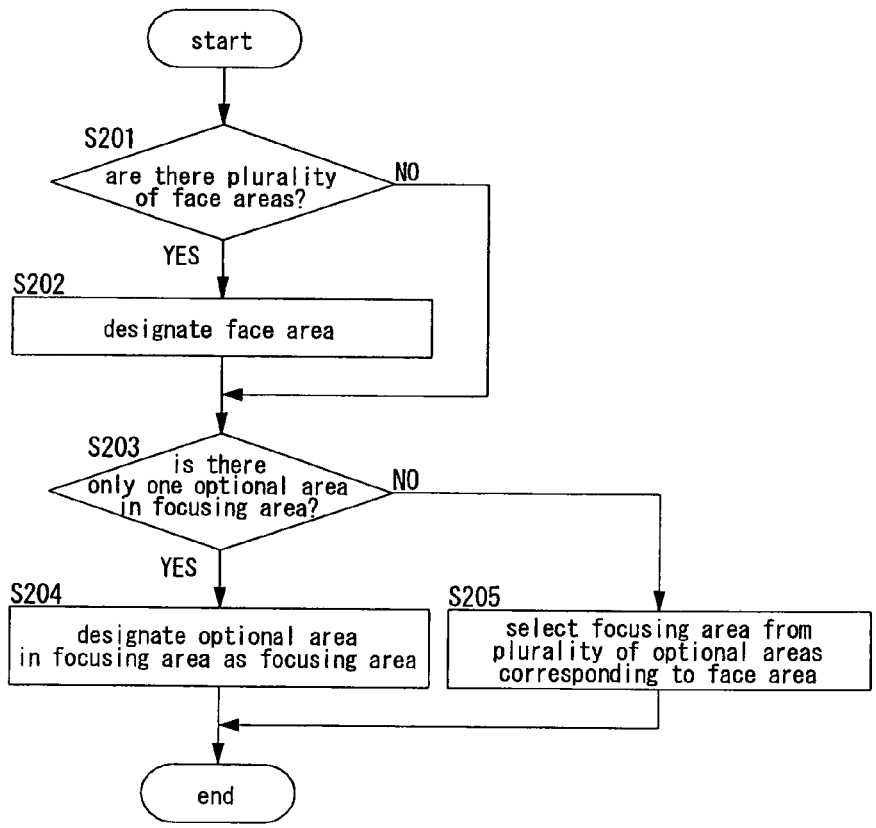
FIG. 7 is a flow chart showing a subroutine at S105 shown in FIG. 5.

Next, with reference to a flow chart shown in FIG. 7, a selecting operation for a focusing area at S105 shown in FIG. 5 will be described in detail.

Step 201: The CPU 39 determines whether or not a plurality of face areas have been detected in the face detecting process at S103. When a plurality of face areas have been detected (YES side), the flow advances to S202. In contrast, when only one face area has been detected (NO side), the flow advances to S203. In this case, the CPU 39 designates the detected face area as a selective target.

Step 202: The CPU 39 designates a face area that is a focusing area in the detected face areas as a selective target. Specifically, the CPU 39 designates the nearest subject face area or a face area at the center in the shooting image plane as a selective target. When the CPU 39 designates the nearest subject face area as a selective target, the CPU 39 may designate a face area whose face size is the largest in the moving image as the nearest subject face area. Instead, the CPU 39 may designate the nearest subject face area as a selective target on the basis of defocus amounts obtained from the optional areas of the focusing section 19.

Step 203: The CPU 39 determines whether or not there is one optional area corresponding to a face area as a selective target. When the foregoing condition is satisfied (YES side), the flow advances to S204. In contrast, when the foregoing condition is not satisfied (NO side), the flow advances to S205.

Step 204: The CPU 39 designates an optional area corresponding to a face area that is a selective target as a focusing area.

Step 205: The CPU 39 selects a focusing area from a plurality of optional areas corresponding to a face area as a selective target. Specifically, the CPU 39 selects an optional area that becomes a focusing area in one of the following methods (1) and (2). In the following methods, the user may selectively input an optional area to the CPU 39 through a menu screen.

(1) The CPU 39 designates an optional area that is the closest to the center of a face area that is a selective target as a focusing area. The center of the face area varies depending on the orientation of the face. For example, when a face is viewed from the front, the center of the face is near the nose. In contrast, when the face is viewed from a side, the center of the face is near one of the ears.

Specifically, the CPU 39 obtains the center of the face based on the contour of the face and the skin color area treated as the face to designate a focusing area. Instead, the CPU 39 may obtain the center of the face based on the relative relationship of the parts (eyes, nose, mouth, etc.) that compose the face. In this case, the CPU 39 can relatively easily designate a focusing area.

(2) The CPU 39 designates an optional area corresponding to the positions of eyes in a face area that is a selective target as a focusing area. This is because it is preferred that when a subject of a person is shot, his or her eyes be focused. Specifically, the CPU 39 obtains the positions of eyes based on feature points in a face area to designate a focusing area. When the CPU 39 detects a face based on a skin color, the CPU 39 may estimate the positions of eyes based on an outer shape of the face area to designate a focusing area.

If there are two optional areas corresponding to the positions of the eyes in the face area, the CPU 39 designates a focusing area in one of the following two methods.

First, the CPU 39 designates an optional area closest to the center of the shooting image plane as a focusing area. In this case, the electronic camera can accomplish AF based on a regular shooting purpose of the user.

Second, the CPU 39 compares outputs of optional areas corresponding to eyes and designates an optional area closest to the subject as a focusing area. In this case, the electronic camera can accomplish AF in a scene of which a subject of a person is shot in the diagonal direction. As a result, the selecting operation of a focusing area is completed.

(Supplementary Description of Embodiment)

(1) In the foregoing embodiment, a monocular reflex type electronic camera was exemplified. However, the present invention can be applied to a monocular reflex type silver salt camera.

(2) In the foregoing embodiment, the case of which the release button is halfway pressed was exemplified. Instead, the CPU may perform the face detecting process with a moving picture at intervals of a predetermined time period.

(3) In the foregoing embodiment, the case of which framing is performed by the viewfinder optical system was exemplified. Instead, framing may be performed with a moving picture displayed on the monitor.

The invention is not limited to the above embodiments and various modifications may be made without departing from the spirit and scope of the invention. Any improvement may be made in part of all of the components.

What is claimed is:

1. A camera comprising:

an imaging section that generates an image data by shooting a subject;

a face detecting section that detects at least one face area in a shooting image plane by performing a face detecting process on the image data generated by the imaging section;

a focusing section that calculates a defocus amount based on a pair of images of a light beam that has passed through a shooting lens of the camera in each of a plurality of optional areas in the shooting image plane; and a controlling section that designates a focusing area among the optional areas based on a detecting result of the face area detected by the face detecting section and performs a focusing operation by controlling the shooting lens based on the defocus amount in the focusing area, wherein the face detecting section detects a face area by performing a face detecting process on the image data within the shooting image plane from which an area that cannot detect a focus at any of the optional areas is excluded.

2. The camera as set forth in claim 1, wherein said controlling section designates said optional area which is closest to a center of said face area as said focusing area when there are a plurality of said optional areas corresponding to the face area among the at least one face area detected by the face detecting section.

3. The camera as set forth in claim 1, wherein said controlling section designates said optional area corresponding to positions of eyes of the face area as the focusing area when there are a plurality of the optional areas corresponding to the face area among the at least one area detected by the face detecting section.

4. The camera as set forth in claim 3, wherein said controlling section designates said optional area closest to a center of the shooting image plane as said focusing area when there are a plurality of said the optional areas corresponding to positions of eyes in said face area.

5. The camera as set forth in claim 3, wherein said controlling section designates said optional area closest to a subject eye corresponding to said face area as said focusing area when there are a plurality of the optional areas corresponding to positions of the eyes in said face area.

6. The camera as set forth in claim 1, wherein, in a case when a number of the face areas detected by the face detecting section is two or more, the controlling section adjusts a depth of field based on the defocus amount obtained from the plurality of the optional areas corresponding to the face areas detected by the face detecting section.

* * * * *